US007917851B1

(12) United States Patent
Lettau (10) Patent No.: US 7,917,851 B1
(45) Date of Patent: Mar. 29, 2011

(54) VIEWING POINT FOR A COMPOSITION WITH MULTIPLE LAYERS

(75) Inventor: Ty Lettau, Hercules, CA (US)

(73) Assignee: Adobe Systems Incorporated, San Jose, CA (US)

( * ) Notice: Subject to any disclaimer, the term of this patent is extended or adjusted under 35 U.S.C. 154(b) by 931 days.

(21) Appl. No.: 11/809,319

(22) Filed: May 31, 2007

(51) Int. Cl.
*G06F 17/00* (2006.01)

(52) U.S. Cl. ........ 715/273; 345/619; 345/628; 345/629; 707/708; 707/729

(58) Field of Classification Search .................. 715/273, 715/764, 766, 790–796; 345/619–629
See application file for complete search history.

(56) References Cited

U.S. PATENT DOCUMENTS

| 6,130,676 A * | 10/2000 | Wise et al. ..................... 345/619 |
| 6,606,105 B1 * | 8/2003 | Quartetti ....................... 715/853 |
| 6,803,923 B1 * | 10/2004 | Hamburg ...................... 345/629 |
| 2005/0144016 A1 * | 6/2005 | Hewitt et al. ................... 704/278 |
| 2008/0030504 A1 * | 2/2008 | Brunner et al. ................ 345/473 |

OTHER PUBLICATIONS

Michael J. Wynblatt, ("Control Layer Primitives for the Layered Multimedia Data Model" Published Nov. 5-9, 1995 pp. 1-23).*

* cited by examiner

*Primary Examiner* — Doug Hutton
*Assistant Examiner* — Quoc A Tran
(74) *Attorney, Agent, or Firm* — Van Pelt, Yi & James LLP (57) ABSTRACT

A position of a viewing point within a plurality of layers of a composition is received. Of the plurality of layers, at least a layer that is immediately adjacent to the viewing point is displayed. Those layers, if any, that are on the opposite side of the viewing point as the displayed layer(s) are not displayed.

30 Claims, 10 Drawing Sheets

FIG. 4C the US 7,917,851 B1

VIEWING POINT FOR A COMPOSITION WITH MULTIPLE LAYERS

BACKGROUND OF THE INVENTION

Software applications for editing and/or laying out objects in a composition often have a concept of layers. For some users (e.g., graphic artists, layout editors, film makers, or other professional users), the number of layers is sometimes in the hundreds or thousands. Although there are benefits to working with layers (e.g., allows precise control over objects in a composition), it would be desirable if improved techniques and/or interfaces for working with layers were created, and in particular for a large number of layers.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
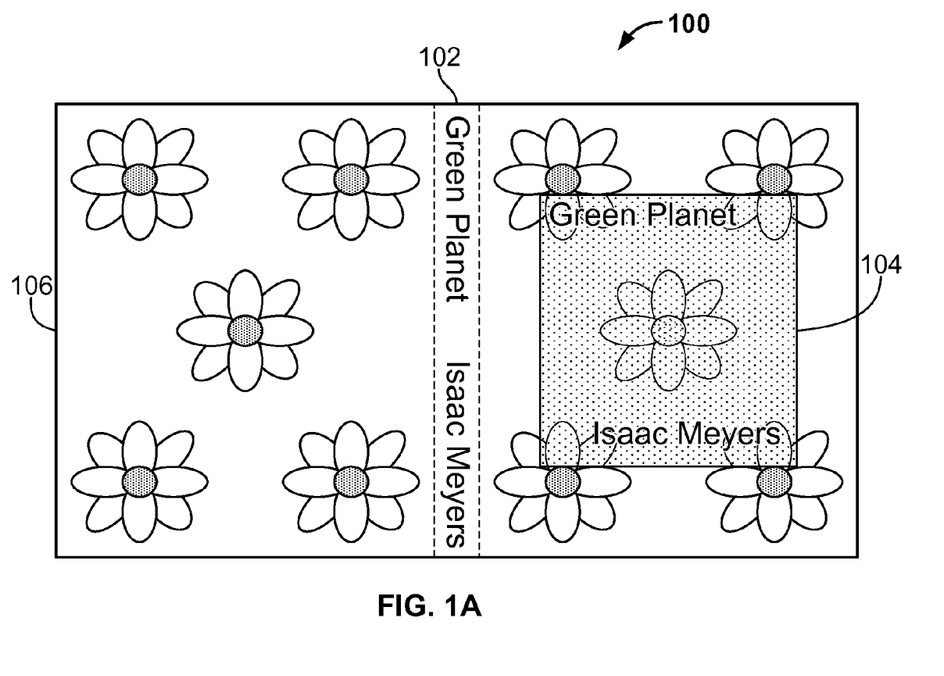
FIG. 1A is a diagram illustrating an embodiment of a viewing point above the top layer of a composition.

FIG. 1A is a diagram illustrating an embodiment of a viewing point above the top layer of a composition. In the example shown, composition 100 is the cover of a book and has five layers. In some embodiments, a given layer is strictly above/below another layer; two layers cannot be at the same level. Layers are stacked or ordered along a z axis and this stacking or ordering specifies the front-to-back ordering of the layers in the composition (i.e., this determines what object (s) are on top of other object(s)). A layer with an order or position of 1 (i.e., layer 1) would be visually "underneath'" a layer with an order or position along the z axis of 2 or greater (i.e., layers 2 or higher). In the examples shown herein, layers are enumerated and are identified by number: the lowest or bottom layer is layer 1, the next layer above that is layer 2, and so on. In FIGS. 1A-1E, flower image 106 is associated with layer 2, front title 104 is associated with layer 4, and spine 102 is associated with layer 5. In some embodiments, layer 1 is referred to as a background and/or is empty (that is, the first user added layer is layer 2). In some embodiments, layers are identified or organized in some other manner, for example by a user assigned name or description.

In various embodiments, layers have various rules or relationships; one software application may define layers differently than another software application. In some software applications, a layer is created for each object or asset. In other software applications, layers are like shelves of a bookcase and one or more objects or assets are in a given layer. In various embodiments, the objects included in or otherwise associated with a layer comprise a variety of data types and include text, images, video, animation, illustrations, audio, etc. In some embodiments, layers are (logically) grouped. For example, in some embodiments, consecutive layers are able to be assigned to a folder and one or more properties or states may be set for all of the layers in the folder. In some embodiments, a folder has a location or placement in a composition with respect to other layer(s) and/or folder(s) and/or there may be multiple layers of hierarchy (e.g., a folder within another folder).

In some embodiments, a user has the ability to make a layer be a hidden layer. For example, some applications may have the default state of a layer be "displayed" but if a user so desires she can change the state to "hidden." A hidden layer is not displayed to a user; in some embodiments, a hidden layer is locked or otherwise is not able to be selected and/or operated on (e.g., to edit an object in the layer, move the layer up/down, etc.). In this example, layer 3 is a hidden layer.

With some other interfaces, if a user wants to view and/or edit a layer that is not on the top, she has to select layers above the desired layer and make them hidden. This may be feasible when there relatively few layers, but when there are many layers this may be time consuming and/or error prone. For example, some users use hidden layers to store comments, data for other versions/views of a composition, or other information the user does not necessarily want displayed. With these other interfaces, a user has to remember which layers should remain hidden when turning back on layers.

What is disclosed is a technique for displaying one or more layers. In some embodiments, a position at which to place a viewing point in layers is received and (at least) the layer immediately adjacent to the viewing point is displayed. As used herein, above/below refers to those layers of a composition that are above/below the viewing point in the z axis or z space. For example, if the viewing point is between layers n and n+1 (also referred to as being above layer n), layers 1 thru n are below the viewing point. In some embodiments, all layers below the viewing point are displayed. Conceptually, this may be thought of as "penetrating" or "diving into" the layers of a composition from above with a camera. The layers above the viewing point are not shown because the viewing point has moved beyond those layers but those upper layers do not necessarily change state from "displayed" to "hidden."

In some embodiments, the techniques or interfaces disclosed herein are added to a software application, for example that is associated with editing, storing, or managing audio and/or visual content, such as still images or video. Some example applications include Adobe® Photoshop®, Adobe® Illustrator®, Adobe® Fireworks®, and Adobe® Flash®.

Returning back to FIG. 1A, the viewing point in that example is above the top layer, layer 5. In that example, all layers below the viewing point are displayed. In other embodiments, only the layer immediately below the viewing point is displayed and in such embodiments only layer 5 would be shown. Spine 102 in this example is in layer 5.

Figure 1B:
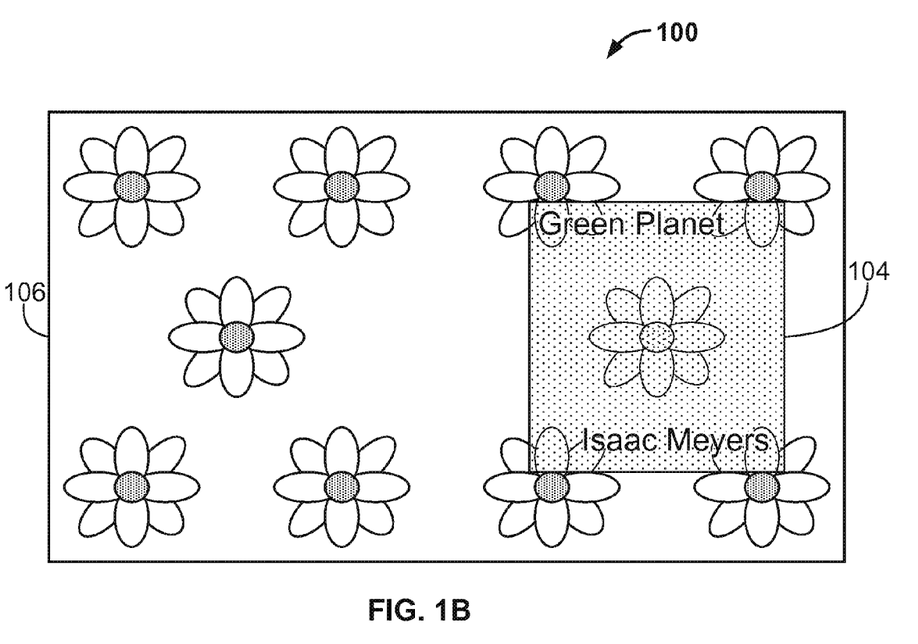
FIG. 1B is a diagram illustrating an embodiment of a viewing point located between layers 4 and 5 of a composition.

FIG. 1B is a diagram illustrating an embodiment of a viewing point located between layers 4 and 5 of a composition. In this example, the viewing point has changed from being above layer 5 (see, e.g., FIG. 1A) to above layer 4. Because of the current position of the viewing point, spine 102 is no longer displayed (e.g., by a software application configured to perform the disclosed techniques).

Figure 1C:
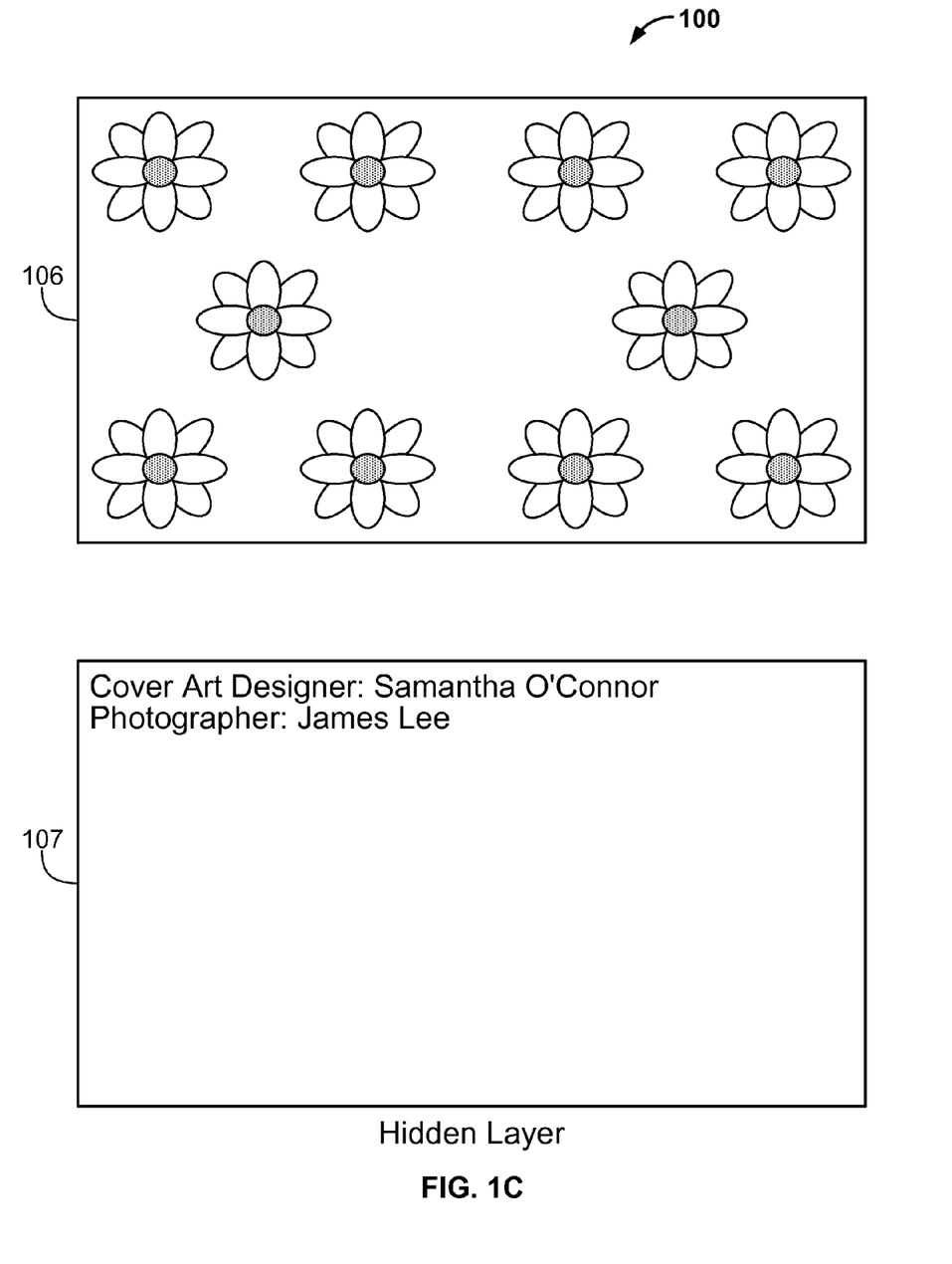
FIG. 1C is a diagram illustrating an embodiment of a viewing point above layer 3 of a composition.

FIG. 1C is a diagram illustrating an embodiment of a viewing point above layer 3 of a composition. In this example, the viewing point is above layer 3 (107). Layer 3 (107) in this example is a hidden layer used to store the credits of composition 100. Layer 3 (107) is shown in the bottom portion of this figure for the reader to more clearly understand the techniques, but is not necessarily displayed.

Figure 1D:
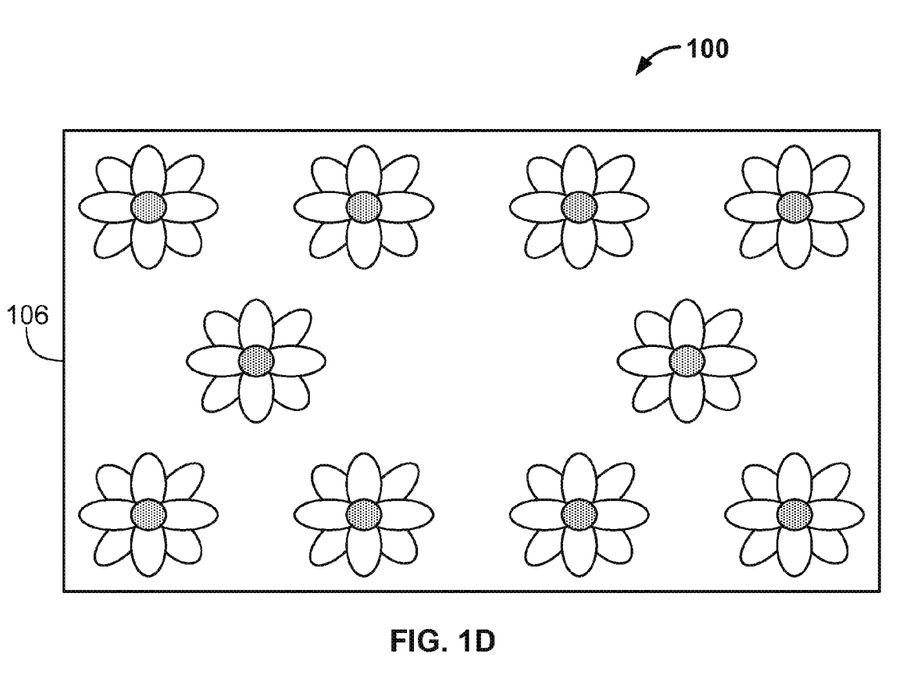
FIG. 1D is a diagram illustrating an embodiment of a viewing point located between layers 2 and 3 of a composition.

FIG. 1D is a diagram illustrating an embodiment of a viewing point located between layers 2 and 3 of a composition. In various embodiments, hidden layers are handled in a variety of ways. In this embodiment, hidden layers are not shown and the same thing is displayed when the viewing point is above layer 3 (see, e.g., FIG. 1C) and when the viewing point is above layer 2 (see, e.g., FIG. 1D). Alternatively, in some embodiments, a hidden layer is shown (e.g., the cover art credits are displayed) even though a layer is "hidden."

Figure 1E:
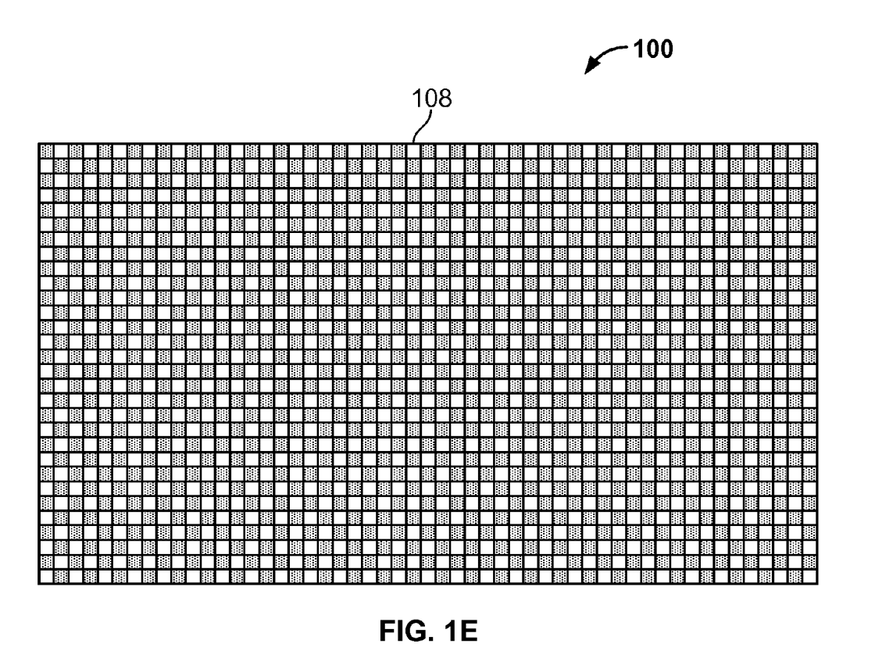
FIG. 1E is a diagram illustrating an embodiment of a viewing point located between layers 1 and 2 of a composition.

FIG. 1E is a diagram illustrating an embodiment of a viewing point located between layers 1 and 2 of a composition. In this example, layer 1 is an empty layer or a background and checkerboard 108 is shown. In some embodiments, the lowest layer that is displayed is the lowest user generated or added layer (e.g., flower image 106).

In some embodiments, a user (if so desired) edits a layer or an object in a layer from any of the views shown in FIGS. 1A-1E. For example, if the user sets the viewing point to be above layer 2 so that the example of FIG. 1D is shown, the user may edit layer 2 (e.g., changing the color of the image, changing the contrast, adding text or other data to the layer, etc). The user may then move the viewing point to another position and perform editing as desired. The exact process for selecting an object or layer to be edited and performing an edit may depend upon the particular software application. For example, Adobe Flash may have certain rules or commands for selecting and/or editing that are different from Adobe Photoshop.

In some software applications that are not configured to perform the techniques disclosed herein, a user must change the state of upper layers to "hidden" before selecting and editing a particular layer. Some embodiments of the techniques disclosed herein overcome this inconvenience. In some embodiments, "penetrating" the layers of a composition with a viewing point also changes what is currently selected or is able to be selected. For example, in some embodiments, layers above the viewing point (and/or objects in those upper layers) are not able to be selected and/or edited while they are above the viewing point.

Although some figures shown herein disclose displaying one or more layers below a viewing point, in some embodiments, one or more layers above a viewing point are displayed. Conceptually, this is like a diver in the ocean looking up and objects or layers below the diver are not seen. The same concepts or variations described for displaying one or more layers below a viewing point can be extended to displaying one or more layers above a viewing point. For example, in some embodiments only the layer immediately above a viewing point is displayed. In other embodiments, all layers above the viewing point are displayed. In some embodiments, only layers that are in a "displayed" state (as opposed to a "hidden" state) above a viewing point are displayed.

Figure 2:
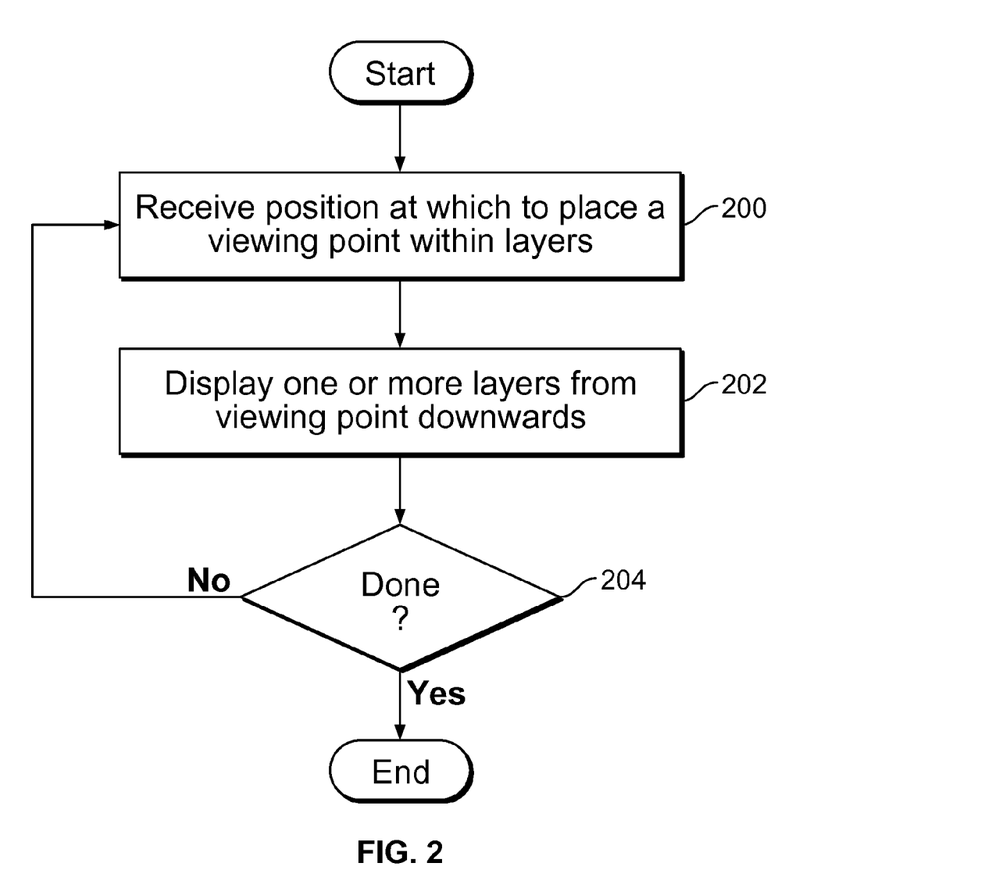
FIG. 2 is a flowchart illustrating a process for displaying one or more layers based on a viewing point.

FIG. 2 is a flowchart illustrating a process for displaying one or more layers based on a viewing point. In some embodiments, the example process is used to display FIGS. 1A-1E. At 200, a position at which to place a viewing point within layers is received. In various embodiments, a user can specify a viewing point's position using keyboard inputs (e.g., in simultaneous combination or in sequence), mouse inputs (e.g., clicks, drag and drop interactions, etc.), stylus inputs, etc. As an example of a keyboard input, the number keys are used to indicate the layer above which to place a viewing point. For example, if the "1" key (in a certain combination or sequence of keyboard inputs) is pressed, the viewing point is "placed" (at least conceptually) above layer 1. As an example of a mouse input, a user double clicks on a desired layer in a layer stack or other graphical user interface in some embodiments to indicate the new position of a viewing point. Examples of graphical user interfaces for controlling a viewing point include pull down menus, knobs, scrollbars, buttons (e.g., "next" or "previous"), etc.

In some embodiments, search capabilities are provided and a user is able to (if so desired) search based on one or more search words. For example, the viewing point is placed above the layer that results from the search, causing one or more layers below the viewing point to be displayed. In some embodiments, if more than one layer results from a search, one of the layers (e.g., the lowest/highest numbered layer, the layer having the highest match value, etc.) is selected as the layer to place the viewing point above. In some configurations, search capabilities are provided in those embodiments that permit a user to assign names or descriptions to layers. In various embodiments, settings or parameters associated with searching (e.g., searching using a Boolean OR or AND if there are multiple search words, specifying particular layers to search through, etc.) are obtained as appropriate.

At 202, one or more layers from a viewing point downwards is/are displayed. In some embodiments, displaying at 202 is performed in response to or is triggered by step 200. For example, receiving a (new) placement or position of the viewing point at 200 causes a corresponding update in the layer(s) that is/are displayed at 202; the layer(s) that are displayed at 202 are based on the (new) position information received at 200. This may be faster or more convenient than other applications that are not configured to perform the techniques disclosed herein and which require a user to manually change the states of some number of consecutive layers from a "displayed" state to a "hidden" state. In some embodiments, all layers below a viewing point are displayed. In some embodiments, all layers that are not in a hidden state are displayed. In some embodiments, only the layer that is immediately below the viewing point is displayed.

In some embodiments, visual cues or effects are used at 202. In some embodiments, when changing or updating a display at 202, layer(s) are "peeled away" (e.g., as if the user were flipping pages in book) or layer(s) change transparency gradually. In some cases, this may remind a user that the viewing point is "penetrating" layers of a composition and/or may provide a more pleasing or intuitive user experience than (for example) abruptly removing/adding layers. However, this is not a requirement and in some embodiments a display is updated immediately.

It is determined at 204 if the process is done. If the process is not done, at 202 a new position for the viewing point is received. For example, in some embodiments, a user has the option of working in a first mode where she can adjust or change the viewing point and a display is correspondingly changed. She also has the option of turning this mode off. This mode may be enable, set, or controlled using a pull down menu, a checkbox, etc.

Figure 3A:
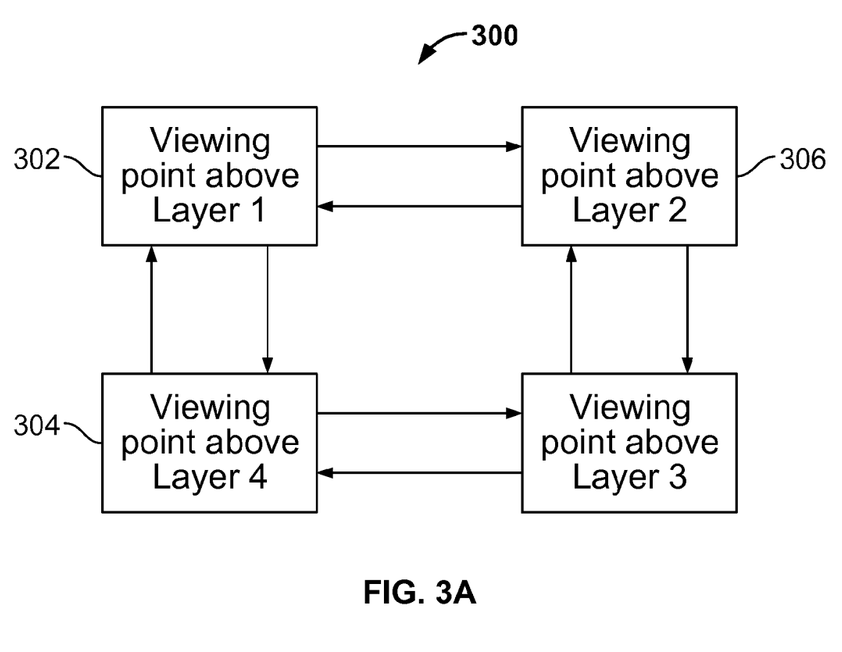
FIG. 3A is a diagram illustrating states associated with a viewing point that is permitted to move up or down by one layer.

In some embodiments, a viewing point is permitted to move to certain positions given its current position. The following figures show some example state diagrams for a composition with four layers. The techniques taught in the following examples may be extended to compositions with any number of layers FIG. 3A is a diagram illustrating states associated with a viewing point that is permitted to move up or down by one layer. Although some other figures shown herein have five layer examples, four layers are shown in this figure for clarity. In state diagram 300, a viewing point is permitted to move to a new position that is one level above or below its immediate position. In this example, the viewing point is permitted to wrap around between layers 1 and 4. If, for example, the viewing point is above layer 1 (state 302), the user can change the viewing point to be above layer 4 (state 304) or above layer 2 (state 306). In some embodiments, the "+" and "−" keys, or up/down or left/right arrow keys are used to change states. In some embodiments, a scrollbar or dial knob is used to control a viewing point.

Figure 3B:
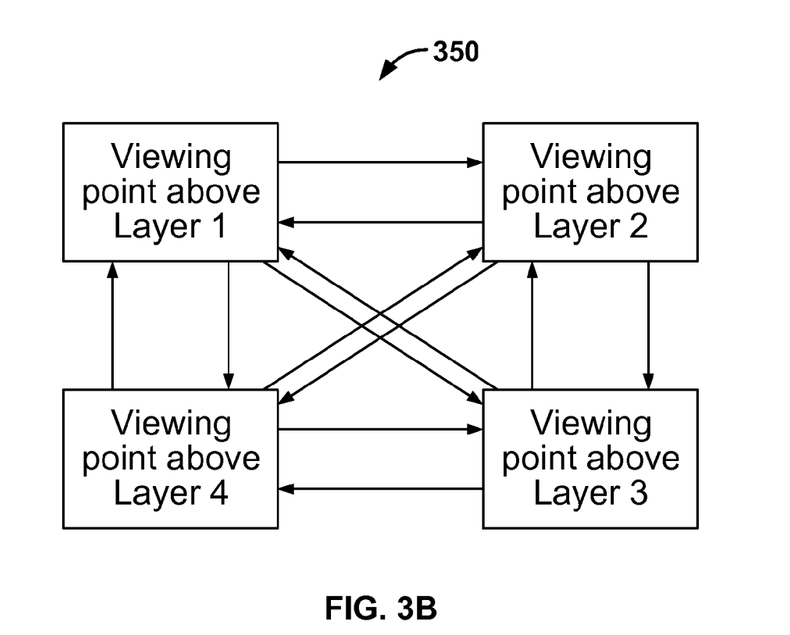
FIG. 3B is a diagram illustrating states associated with a viewing point that can move to an arbitrary new position.

FIG. 3B is a diagram illustrating states associated with a viewing point that can move to an arbitrary new position. In the example shown, a viewing point can move to any new position within state diagram 350 regardless of the current position of the viewing point. In some embodiments, the new position of a viewing point is specified using number keys. For example, if the user wants to move the viewing point to be above layer 56 (of a total of 100 layers), the user presses the "0" key, the "5" key, and the "6" key. In some embodiments, a user can specify a number of layers to jump up/down. For example, to move the viewing point 10 layers up, the user may press the "+" key, the "1" key, and the "0" key. In some embodiments, some other sequence or combination is used.

In some embodiments, an indication is presented to a user indicating where the viewing point is within the layers of a composition (e.g., using text and/or a graphical user interface). Some examples are shown in the following figures.

Figure 4A:
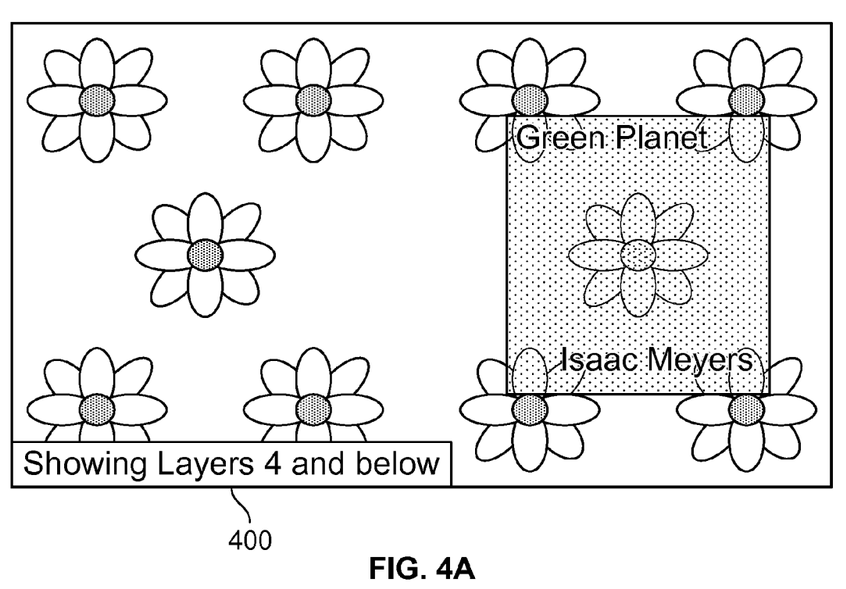
FIG. 4A is a diagram illustrating an embodiment of indicator that includes text.

FIG. 4A is a diagram illustrating an embodiment of indicator that includes text. In the example shown, the viewing point is located above layer 4. Text indicator 400 says, "Showing layers 4 and below." In this particular embodiment, all layers below the viewing point are displayed. In embodiments where only the layer immediately below the viewing point is displayed, text indicator 400 is modified accordingly to say, "Showing layer 4."

Figure 4B:
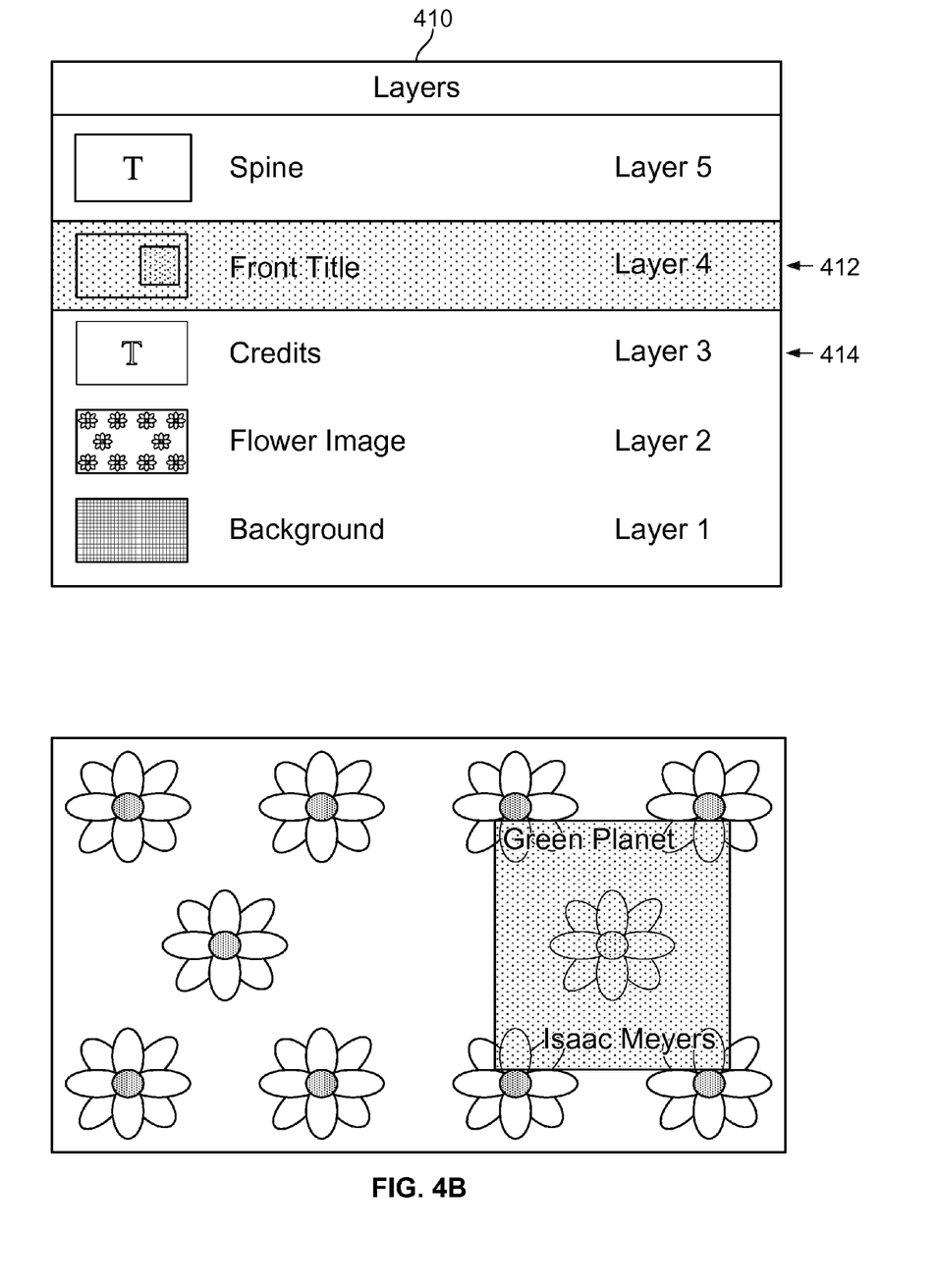
FIG. 4B is a diagram illustrating an embodiment of layer stack with a highlight to indicate the position of the viewing point.

FIG. 4B is a diagram illustrating an embodiment of layer stack with a highlight to indicate the position of the viewing point. In the example shown, the viewing point is above layer 4 in a composition. In some cases, layer stack 410 is an existing interface in a software application. Layer stack 410 includes in the leftmost column a thumbnail or graphical representation of the particular layer. In some cases, the type of layer is indicated (e.g., layers 5 and 3 are indicated to be text type layers) and in other cases the actual content is shown (e.g., layers 1, 2, and 4). The middle column includes user assigned names or descriptions; the rightmost column includes the layer number. In some other embodiments, a layer stack includes some other components, is arranged differently, etc.

In this example, the layer that is directly below the viewing point is highlighted. The viewing point is currently above layer 4 and row 412 is highlighted.

In this example, all layers are indicated in layer stack 410, including hidden layer 3. To indicate that a layer is hidden, the corresponding row (i.e., row 414) is grayed out. In some embodiments, in addition to indicating the current position of the viewing point, layer stack 410 is able to be manipulated by a user to control the position of the viewing point. For example, if the user wants to move the viewing point to be above layer 2, the user clicks on the row corresponding to layer 2 in layer stack 410.

Figure 4C:
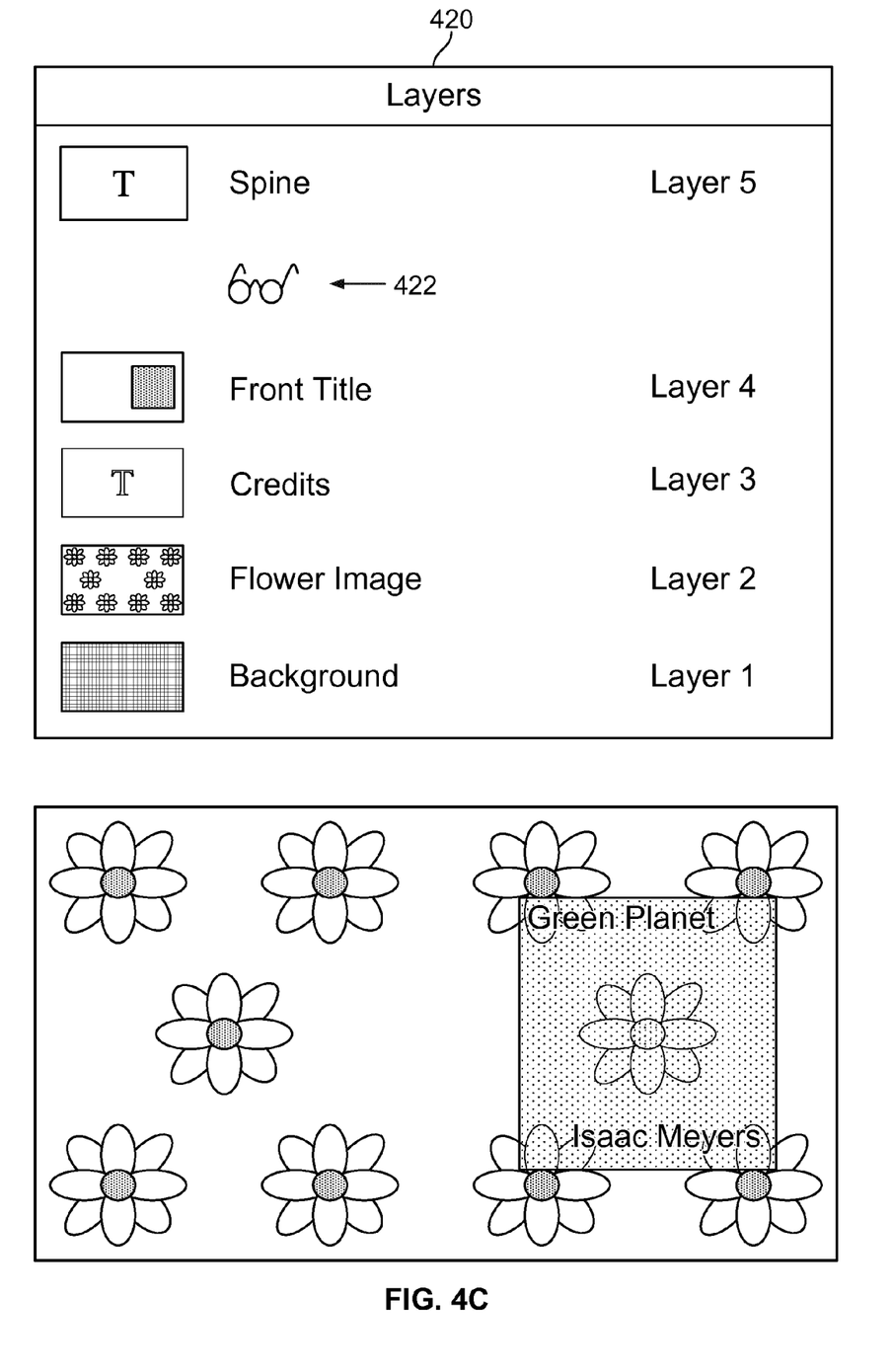
FIG. 4C is a diagram illustrating an embodiment of a layer stack with an icon to indicate the position of the viewing point.

FIG. 4C is a diagram illustrating an embodiment of a layer stack with an icon to indicate the position of the viewing point. In the example shown, the viewing point is above layer 4 in a composition. In layer stack 420, icon 422 corresponds to the viewing point. In this example, the icon is a pair of eyeglasses but other icons such as binoculars or a pair of eyes may be used.

The figures above provide some examples for indicating and/or controlling the position of a viewing point within layers of a composition. In other embodiments, the examples shown herein are combined, supplemented, or replaced with other indicators and/or controls as appropriate (e.g., with dials, knobs, slide bars, a space between two layers, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving at a processor a position of a viewing point within a plurality of layers of a composition; and
   in the event that the viewing point is looking down at the layers below the viewing point:
   of the plurality of layers, displaying at least a layer that is immediately below the viewing point, wherein those layers that are above are not displayed; and
   in the event that the viewing point is looking up at the layers above the viewing point:
   of the plurality of layers, displaying at least a layer that is immediately above the viewing point, wherein those layers that are below the viewing point are not displayed, and only layers that are in a displayed state above the viewing point are displayed;

wherein the displayed layer is set to be the editing layer and the viewing point can be moved to another position to perform edits as desired; and wherein search capabilities are provided, the search capabilities including: an ability to search based on one or more search words; and the viewing point being placed above the layer that results from the search, causing one or more layers below the viewing point to be displayed.

2. A method as recited in claim 1, wherein all layers below the viewing point are displayed.

3. A method as recited in claim 1, wherein all layers below the viewing point that are not in a hidden state are displayed.

4. A method as recited in claim 1, wherein the composition includes a still image.

5. A method as recited in claim 1, wherein the composition includes video.

6. A method as recited in claim 1, wherein the composition includes audio.

7. A method as recited in claim 1, wherein at least one of the plurality of layers is a hidden layer.

8. A method as recited in claim 1, wherein at least one of the plurality of layers includes a plurality of objects.

9. A method as recited in claim 1 further comprising:
receiving a modification to be performed associated with the displayed layer(s); and
performing the modification.

10. A method as recited in claim 1, wherein receiving the indication includes receiving input from at least one of a mouse, stylus, or a keyboard.

11. A method as recited in claim 1, wherein receiving the indication includes receiving a selection from a graphical user interface.

12. A method as recited in claim 1, wherein receiving the indication includes receiving a sequence of inputs associated with a particular one of the plurality of layers.

13. A method as recited in claim 1, wherein receiving the indication includes receiving a simultaneous combination of inputs associated with a particular one of the plurality of layers.

14. A method as recited in claim 1 further comprising displaying an indication associated with the position of the viewing point.

15. A method as recited in claim 14, wherein the indication includes text.

16. A method as recited in claim 14, wherein the indication includes a layer stack with a highlighted layer.

17. A method as recited in claim 14, wherein the indication includes a layer stack with an icon representing the viewing point.

18. A method as recited in claim 1 further comprising:
receiving a new position for the viewing point; and
displaying at least a layer that is immediately adjacent to the new position of the viewing point, wherein those layers that are on the opposite side of the new position of the viewing point are not displayed.

19. A system, comprising:
an interface configured to receive a position of a viewing point within a plurality of layers of a composition; and
a display configured to:
in the event that the viewing point is looking down at the layers below the viewing point:
of the plurality of layers, display at least a layer that is immediately below the viewing point, wherein those layers that are above are not displayed; and in the event that the viewing point is looking up at the layers above the viewing point:
of the plurality of layers, display at least a layer that is immediately above the viewing point, wherein those layers that are below the viewing point are not displayed, and only layers that are in a displayed state above the viewing point are displayed;

wherein the displayed layer is set to be the editing layer and the viewing point can be moved to another position to perform edits as desired; and wherein search capabilities are provided, the search capabilities including: an ability to search based on one or more search words; and the viewing point being placed above the layer that results from the search, causing one or more layers below the viewing point to be displayed.

20. A system as recited in claim 19, wherein all layers below the viewing point are displayed.

21. A system as recited in claim 19, wherein all layers below the viewing point that are not in a hidden state are displayed.

22. A system as recited in claim 19, wherein the interface is further configured to receive a modification to be performed associated with the displayed layer(s) and the system further includes a processor configured to perform the modification.

23. A system as recited in claim 19, wherein the display is further configured to display an indication associated with the position of the viewing point.

24. A system as recited in claim 19, wherein the interface is further configured to receive a new position for the viewing point and the display is further configured to display at least a layer that is immediately adjacent to the new position of the viewing point, wherein those layers that are on the opposite side of the new position of the viewing point are not displayed.

25. A computer program product, the computer program product being embodied in a non-transitory computer readable storage medium and comprising computer instructions for:
receiving a position of a viewing point within a plurality of layers of a composition; and
in the event that the viewing point is looking down at the layers below the viewing point:
of the plurality of layers, displaying at least a layer that is immediately below the viewing point, wherein those layers that are above the viewing point are not displayed; and
in the event that the viewing point is looking up at the layers above the viewing point:
of the plurality of layers, displaying at least a layer that is immediately above the viewing point, wherein those layers that are below the viewing point are not displayed, and only layers that are in a displayed state above the viewing point are displayed;
wherein the displayed layer is set to be the editing layer and the viewing point can be moved to another position to perform edits as desired; and
wherein search capabilities are provided, the search capabilities including: an ability to search based on one or more search words; and the viewing point being placed above the layer that results from the search, causing one or more layers below the viewing point to be displayed.

26. A computer program product as recited in claim 25, wherein all layers below the viewing point are displayed.

27. A computer program product as recited in claim 25, wherein all layers below the viewing point that are not in a hidden state are displayed.

28. A computer program product as recited in claim 25, the computer program product further comprising computer instructions for:
  receiving a modification to be performed associated with the displayed layer(s); and
  performing the modification.

29. A computer program product as recited in claim 25, the computer program product further comprising computer instructions for displaying an indication associated with the position of the viewing point.

30. A computer program product as recited in claim 25, the computer program product further comprising computer instructions for:
  receiving a new position for the viewing point; and
  displaying at least a layer that is immediately adjacent to the new position of the viewing point, wherein those layers that are on the opposite side of the new position of the viewing point are not displayed.

\* \* \* \* \*